United States Patent
Doliwa (10) Patent No.: US 11,688,112 B2
(45) Date of Patent: Jun. 27, 2023

(54) METHOD FOR GENERATING DETAILED VISUALIZATION OF MACHINE LEARNING MODEL BEHAVIOR

(71) Applicant: NXP B.V., Eindhoven (NL)

(72) Inventor: Peter Doliwa, Hamburg (DE)

(73) Assignee: NXP B.V., Eindhoven (NL)

( * ) Notice: Subject to any disclaimer, the term of this patent is extended or adjusted under 35 U.S.C. 154(b) by 99 days.

(21) Appl. No.: 17/302,592

(22) Filed: May 7, 2021

(65) Prior Publication Data
US 2022/0358695 A1  Nov. 10, 2022

(51) Int. Cl.
*G06T 11/20* (2006.01)
*G06T 3/40* (2006.01)
*G06N 5/04* (2023.01)
*G06N 20/00* (2019.01)

(52) U.S. Cl.
CPC .............. *G06T 11/206* (2013.01); *G06N 5/04* (2013.01); *G06N 20/00* (2019.01); *G06T 3/40* (2013.01); *G06T 2210/22* (2013.01)

(58) Field of Classification Search
CPC ..... G06T 11/206; G06T 3/40; G06T 2210/22; G06N 5/04; G06N 20/00
See application file for complete search history.

(56) References Cited

U.S. PATENT DOCUMENTS

| | | | |
|---|---|---|---|
| 10,402,692 B1 | 9/2019 | Kim et al. | |
| 10,692,243 B2 | 6/2020 | Vajda et al. | |
| 11,023,730 B1* | 6/2021 | Zhou | G06F 18/214 |
| 2012/0328210 A1* | 12/2012 | Fattal | G06T 3/403 |
| | | | 382/264 |
| 2019/0073553 A1 | 3/2019 | Yao et al. | |
| 2020/0357117 A1* | 11/2020 | Lyman | G16H 50/20 |
| 2021/0247735 A1* | 8/2021 | Luan | B33Y 50/00 |
| 2021/0406678 A1* | 12/2021 | Martin | G06N 3/08 |
| 2022/0138505 A1* | 5/2022 | Lam | G06N 3/084 |
| | | | 382/157 |
| 2022/0147751 A1* | 5/2022 | Vitek | G06V 10/82 |

OTHER PUBLICATIONS

Gao, Mingfei "Dynamic Zoom-in Network for Fast Object Detection in Large Images"; arXiv.org > cs > arXiv:1711.05187; Submitted Nov. 14, 2017; Last Revised Mar. 27, 2018.
Lu, Yongxi "Adaptive Object Detection Using Adjacency and Zoom Prediction"; arXiv.org > cs > arXiv:1512.07711; Submitted Dec. 24, 2015, Last Revised Apr. 11, 2016.

(Continued)

*Primary Examiner* — Michael Le
(74) *Attorney, Agent, or Firm* — Daniel D. Hill (57) ABSTRACT

A method is provided for generating a visualization for explaining a behavior of a machine learning (ML) model, the method includes inputting an image into a machine learning (ML) model for an inference operation. A first heatmap is generated for the image using a first visualization method. An area of highest attention is selected on the first heatmap based a predetermined threshold. The selected area is cropped from the image. The cropped selected area is upscaled. A second heatmap is generated for the cropped and upscaled selected area of the image. A final visualization is presented for analysis. In another embodiment, a computer program comprising instructions for executing the method is provided.

18 Claims, 4 Drawing Sheets

(56) References Cited

OTHER PUBLICATIONS

Ren, Shaoqing et al.; "Faster R-CNN: Towards Real-Time Object Detection with Region Proposal Networks"; IEEE Transactions on Pattern Analysis and Machine Intelligence, vol. 39, Issue 6; Jun. 1, 2017; doi: 10.1109/TPAMI.2016.2577031.

Rosebrock, Adrian; "Grad-CAM: Visualize Class Activation Maps with Keras, TensorFlow, and Deep Learning"; Mar. 9, 2020; Blog downloaded from the Internet: https://www.pyimagesearch.com/2020/03/09/grad-cam-visualize-class-activation-maps-with-keras-tensorflow-and-deep-learning/.

Selvaraju, Ramprasaath R. et al.; Grad-CAM: Visual Explanations from Deep Networks via Gradient-Based Localization; arXiv.org > cs > arXiv:1610.02391; Submitted Oct. 7, 2016, Last Revised Dec. 3, 2019; https://doi.org/10.1007/s11263-019-01228-7.

Ulyanin, Stephan "Implementing Grad-CAM in PyTorch"; Feb. 21, 2019; Downloaded from the Internet: https://medium.com/@stepanulyanin/implementing-grad-cam-in-pytorch-ea0937c31e82.

\* cited by examiner

METHOD FOR GENERATING DETAILED VISUALIZATION OF MACHINE LEARNING MODEL BEHAVIOR

BACKGROUND

Field

This disclosure relates generally to machine learning, and more particularly, to a method for generating a more detailed visualization of a behavior of a machine learning (ML) model.

Related Art

Machine learning (ML) is becoming more widely used in many of today's applications, such as applications involving forecasting and classification. Generally, a ML model is trained, at least partly, before it is used. Training data is used for training a ML model. Machine learning models may be classified by how they are trained. Supervised learning, unsupervised learning, semi-supervised learning, and reinforcement learning are examples of training techniques.

Machine learning models have been used to classify images. Machine learning models have also been used in object detection to locate and classify various objects in an image. In object detection, each object in an image may be labeled so that an image may include more than one label. Object detection is useful in automotive applications such as autonomous driving where the automobile needs to locate objects in the images captured by cameras on the automobile. In autonomous driving, for example, object detectors typically need to operate in a low-latency online fashion and to preserve the privacy of the user.

In ML, improving human interpretability and explainability of results is an important problem. A lack of understanding how a ML model derives its conclusions makes it difficult to verify that the ML model is working as expected and no significant flaws of the model are overlooked. The lack of understanding can cause mistrust and security concerns that hinder the use of ML for important tasks.

Many different approaches exist to generate visualizations that show the user which parts of the input were the most important for the model to derive its conclusion. When used on a model for image classification for example, these visualizations show the influence of each individual input pixel or groups of pixels on the classification result. Similar visualizations can also be applied to models used for object detection. All existing approaches have limitations that limit their use for explaining model behavior. Specifically, for convolutional neural networks (CNN), several variants of visualization methods have been developed (e.g. GradCAM (gradient-weighted class activation mapping) and Ablation-CAM) that generate heatmaps showing the most influential areas of the input for a target classification based on the activation maps of a selected convolutional layer of the CNN. These methods are considered to generate good explanations in general and are relatively computationally inexpensive, but their ability to explain model behavior is severely limited by their relatively low resolution.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for providing a more detailed visualization for explaining the behavior of a ML model. The method first generates a first heat map to find an area in an input sample above a predetermined threshold that indicates the most important area for a specified target classification. The area is cropped from the input sample and upscaled to, for example, the input resolution. A second heatmap is generated of the cropped area to allow a more detailed explanation of the influence this area had on the classification result. Because the area is upscaled, the heatmap can provide a more detailed visualization and provide better insight into why the ML model made the classification it made.

The method may be used in, for example, classifiers and object detectors.

In accordance with an embodiment, there is provided, a method for generating a visualization for explaining a behavior of a machine learning (ML) model, the method including: inputting an image into a ML model for an inference operation; generating a first heatmap for the image using a first visualization method; selecting an area of highest attention on the first heatmap using a predetermined threshold; cropping the selected area from the image; upscaling the cropped selected area; generating a second heatmap for the cropped and upscaled selected area of the image; and presenting a final visualization for analysis. Generating the second heatmap for the cropped and upscaled selected area of the image may further include generating the second heatmap for the cropped and upscaled selected area of the image using a second visualization method. The first and second visualization methods may each be the GradCAM visualization method. The first visualization method may be a GradCAM visualization method and the second visualization method may be a visualization method different from the GradCAM visualization method. Upscaling the cropped selected area may further include one of either zooming in the cropped selected area or using the cropped selected area from the image when the image has a higher resolution than the cropped image. Selecting the area of highest attention on the first heatmap using a predetermined threshold may further include selecting multiple areas of highest attention that exceed the predetermined threshold. Generating a first heatmap for the image using a first visualization method may further include generating the first heatmap for the image using GradCAM on a last convolutional layer of a neural network of the ML model. The predetermined threshold may be equal to a $75^{th}$ percentile of heatmap values. Generating a second heatmap for the cropped and upscaled selected area of the image may further include generating the second heatmap for the cropped and upscaled selected area using GradCAM on a last convolutional layer of a neural network of the ML model.

In accordance with another embodiment, there is provided, a computer program comprising instructions executable by a processor, for executing a method for generating a visualization for explaining a behavior of a machine learning (ML) model, the executable instructions including: instructions for inputting an image into a ML model for an inference operation; instructions for generating a first heatmap for the image using a first visualization method; instructions for selecting an area of highest attention on the first heatmap using a predetermined threshold; instructions for cropping the selected area from the image; instructions for upscaling the cropped selected area; instructions for generating a second heatmap for the cropped and upscaled selected area of the image; and instructions for presenting a final visualization for analysis. The instructions for generating the second heatmap for the cropped and upscaled selected area of the image may further include instructions for generating the second heatmap for the cropped and upscaled selected area of the image using a second visualization method. The first and second visualization methods may each be the GradCAM visualization method. The first visualization method may be a GradCAM visualization method and the second visualization method may be a visualization method different from the GradCAM visualization method. The instructions for upscaling the cropped selected area may further include one of either zooming in the cropped selected area or using the cropped selected area from an original image when the original image has a higher resolution than the cropped image. The instructions for selecting the area of highest attention on the first heatmap using a predetermined threshold may further include instructions for selecting multiple areas of highest attention that exceed the predetermined threshold. The instructions for generating the first heatmap for the image using a first visualization method may further include instructions for generating the first heatmap for the image using GradCAM on a last convolutional layer of a neural network of the ML model. The predetermined threshold may be equal to a $75^{th}$ percentile of heatmap values. The instructions for generating a second heatmap for the cropped and upscaled selected area of the image may further include instructions for generating the second heatmap for the cropped and upscaled selected area using GradCAM on a last convolutional layer of a neural network of the ML model.

Figure 1:
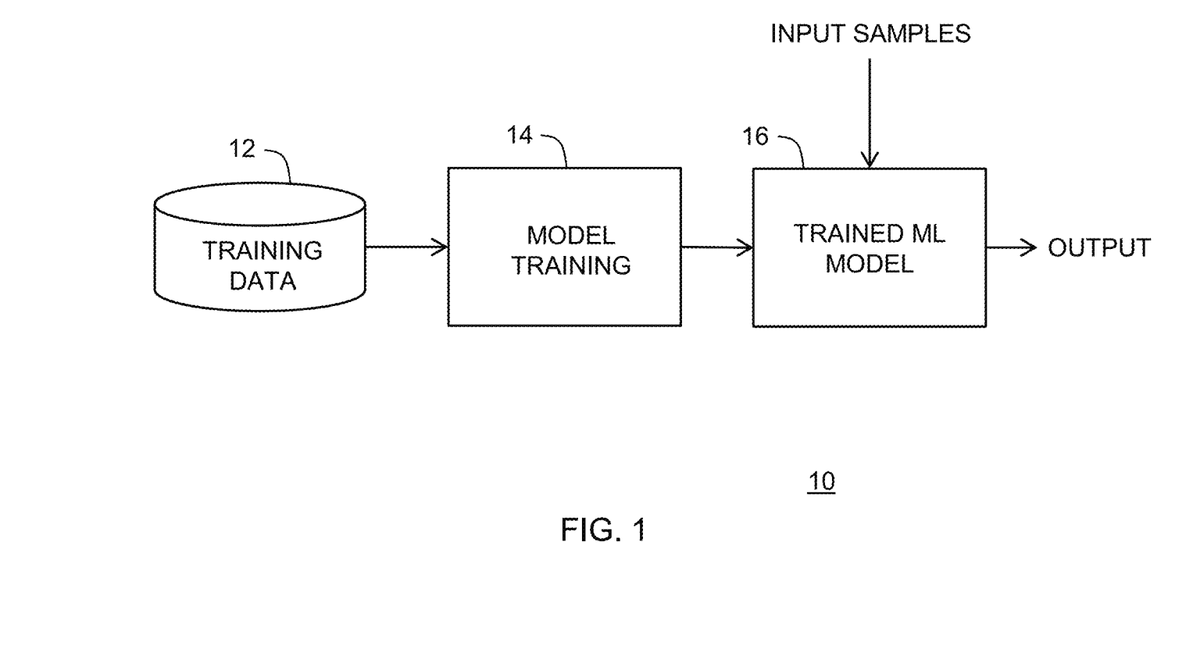
FIG. 1 illustrates a simplified system for training and using a ML model in accordance with an embodiment.

FIG. 1 illustrates a simplified system for training and using a ML model in accordance with an embodiment. System 10 includes labeled set of ML training data 12, model training block 14, and resulting trained ML model 16. In one embodiment, system 10 is implemented as a computer program stored on a non-transitory medium comprising instructions that are executable on a processor.

One example embodiment includes a neural network (NN) algorithm used to classify images as trained using a training data set 12. In another embodiment, training data set 12 may be used for object detection in an image. Various training data sets can be acquired, such as for example, the CIFAR10 data set for image classification and the PASCAL Visual Object Classes (VOC) data set for object classification. A ML algorithm for a vision-based classification problem only returns a single output prediction (a class label) for an input image. A ML algorithm for an object detection problem, which is commonly referred to as an object detector can, on the other hand, return multiple output predictions for a single input image, one output prediction for every identified object. Every output prediction consists of a class label as well as a bounding box that contains the object. For discussion purposes, the ML model is based on a neural network (NN) algorithm and the training data includes a plurality of images. In other embodiments, the ML algorithm and training data may be different.

The ML model is trained in model training 14 using training data 12 comprising a plurality of labeled images. The training data may include images that are labeled by classes, such as for example, bird, cat, dog, bus, traffic light, etc. If the ML model is to be used as an object detector, the training data includes images with more than one labeled object. After training, the trained ML model 16 can be used for inference operations. In an inference operation, one or more input samples labeled "INPUT SAMPLES" are input into ML Model 16 and an output classification labeled "OUTPUT" is provided by the model.

Figure 2:
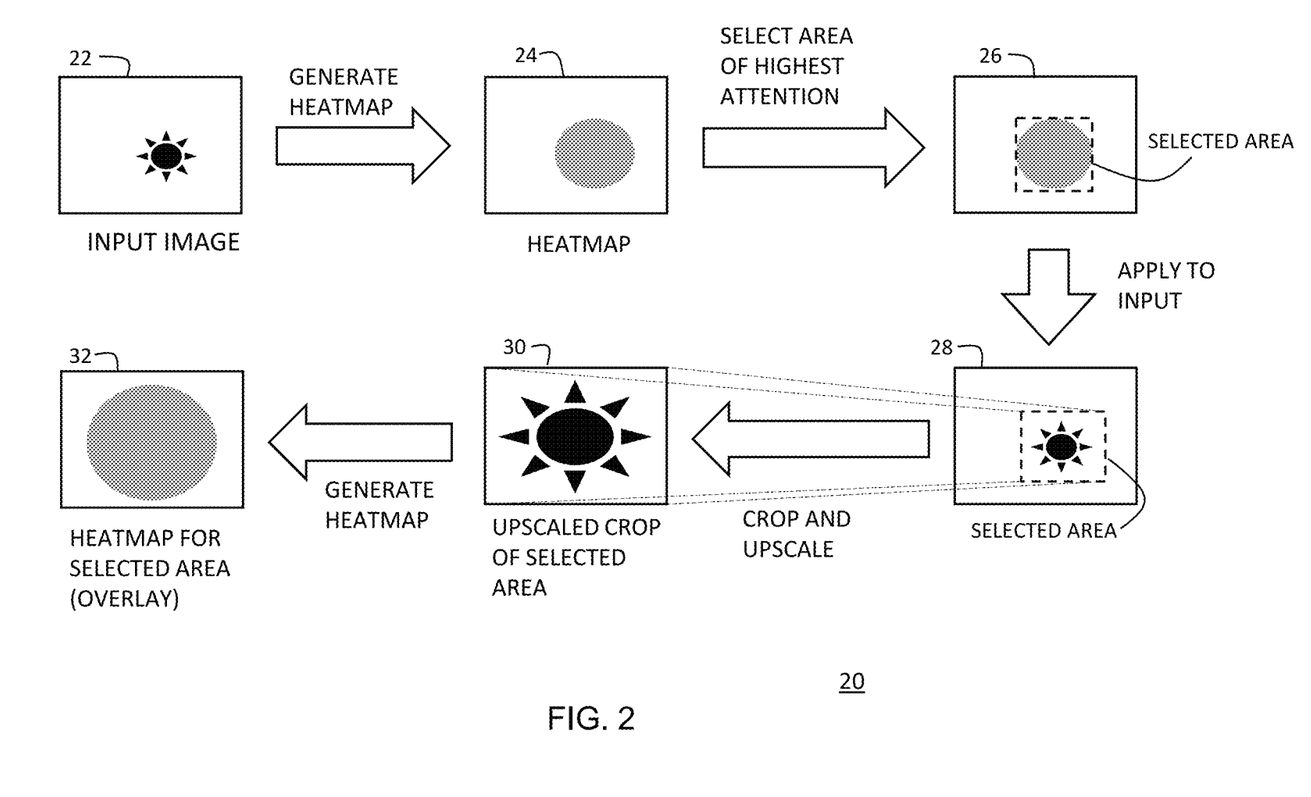
FIG. 2 illustrates a flow diagram of a method for generating a higher resolution visualization.

FIG. 2 illustrates a flow diagram of method 20 for generating a higher resolution visualization. The currently available methods for providing interpretability and explainability are considered to generate good explanations in general and are relatively computationally inexpensive, but their ability to explain model behavior is severely limited by their low resolution compared to the input resolution. The low resolution is a direct result of the trade-off that is made when selecting a convolutional layer for the visualization. For example, more and more noise is added and heatmaps get less semantically meaningful towards the beginning of the convolutional neural network (CNN) while the resolution is increasingly reduced towards the end of the network. This means that in order to generate the most meaningful visualizations the layer that is typically selected is very close to the end of the network which results in a very low resolution. For example, when using the neural network architecture MobileNetv2, input images may have a resolution of 224×224 pixels. By the time the processing moves to one of the last convolutional layers the resolution of the generated visualizations may be reduced to only 7×7 pixels. This low resolution makes it hard to interpret the visualizations in many cases, especially if smaller objects are involved or the classification decision of the model depends on finer details of the input.

The method disclosed herein improves generated visualizations by focusing on a smaller area of interest so that the full resolution of the visualization method is available for that area.

Generally, in the method for improving explainability, a first visualization method is used to find an area of interest in an input image for a neural network (i.e. an area that is the most influential for a given target classification as determined by the model). This area of interest is then cropped out of the image and scaled up to the original input resolution. A second visualization method is then used to visualize the influence of each individual input pixel or groups of pixels on the target classification. The resulting visualization can then be shown directly, overlayed over the cropped image or overlayed over the original image to enhance the explainability of the decisions made by the CNN.

The disclosed embodiments are applicable to all types of ML where images (or video, i.e. a stream of multiple images) are used as input or where the input is treated as if it were an image, for example in image classification or image object detection use cases. For these applications, convolutional neural networks (CNNs) are the most commonly used type of ML models. As mentioned previously, to improve explainability of the model behavior, many different approaches exist to generate visualizations that show the user which parts of the input are the most important for the model to derive its conclusion. In case of an image classifier the visualization shows which parts of the input image are seen as the most important by the model for a given target class (which does not necessarily have to be the actual predicted class).

One widely used example for these visualization methods is GradCAM (gradient-weighted class activation mapping). GradCAM generates heatmaps showing the most influential areas of the input for a target classification based on a weighted sum of the activation maps of a selected convolutional layer. For weights it uses the gradients for the target class as an estimation for the importance of each activation map for the target class. A trade-off is made when selecting a convolutional layer for GradCAM as the highest resolution is retained towards the beginning of the CNN but as more noise is added the heatmaps get semantically less meaningful. In order to generate the most meaningful visualizations the convolutional layer that is typically selected is very close to the end of the network, i.e. the last convolutional layer.

As shown in FIG. 2, in step 22, an image is input to the ML model. In step 24, a first GradCAM heatmap is generated to find the area in the input image that is seen by the model as the most important for the classification as the target class (i.e. the area that has the highest model attention for the target class). In one embodiment, the area of interest is chosen by the developer and can be any part of the image. In another embodiment, the area is chosen based on a threshold. For illustration purposes, in FIG. 2, the selected area is a rectangle and surrounds a sun symbol. The sun symbol is representative of any portion of an image that is of interest for analysis, e.g., a dog, cat, bus, traffic light, etc. The first GradCAM heatmap shows the area with the highest model attention based on a threshold. At step 26, the smallest rectangle such that all areas where the heatmap value is greater than or equal to the threshold are inside the rectangle. This threshold can be a fixed value or dynamically calculated based on the heatmap. In experiments, a dynamic threshold equal to the 75th percentile of the heatmap values reliably selected an area of interest that contained the object representing the target class while at the same time being small enough to benefit from the gain in resolution when focusing on the selected area only. As shown in steps 24 and 26, a heatmap of an image typically appears as a very out of focus version of the image and doesn't necessarily look like the visual image. At step 28, the selected area of highest attention is cropped from the input image and scaled up to the original input resolution of the model using linear interpolation. Using linear interpolation delivers good results but any other method for upscaling is also possible. In many cases the input sample from the dataset has a higher resolution than can be input into the ML model, so the input is actually downscaled before providing the input to the model. In this case, upscaling may not be necessary because the higher resolution input sample can be used. At step 30, a second GradCAM heatmap is generated of the cropped and upscaled selected area. The second GradCAM visualization differs from the first visualization in that the whole resolution of the visualization is used only for the selected area of interest to get more information on finer details of the selected area. In step 32, a final visualization is then presented to the user, which can be either just showing the heatmap itself, overlaying the heatmap over the cropped image or overlaying the heatmap over the original image. The user may be a human user or a computer system. When overlaying the heatmap over the cropped image the heatmap is scaled to the original image size, if necessary. When overlaying the heatmap over the complete original image, the heatmap is scaled to the original width and height of the selected area and only overlayed over this area, alternatively both the first and second heatmap can be combined before overlaying them over the original image. Alternatively, more than one area of highest model attention can be selected, cropped, visualized and combined to one heatmap.

The disclosed embodiments improve the resolution of the visualizations used to visualize the influence or importance of individual pixels or groups of pixels of the input image. This allows the user to visualize finer details that help explain model behavior in cases where the original resolution is not enough or that help to increase confidence in the interpretation of model behavior (e.g. when examining misclassifications there are many cases where the visualizations for correct class and predicted class are very close to each other). The use of the first visualization method to select the area of highest model attention allows this method to automatically select the most important areas of the input image from the perspective of the model.

The disclosed method can also be used to verify the correctness of generated visualizations in an automated way. Instead of cropping the selected area of highest attention, the area is covered by a patch (e.g. by a solid grey patch) and run through the model again. If the expected significant decrease in confidence of the target class is indeed observed, the visualization is valid, otherwise it's probably not valid.

The method can also be used to examine the influence of the background itself or other objects in the background on the classification decision of the model. When the cropped area of highest attention is run through the model and confidence in the target class decreases, then there may be a bias in the model towards the target class in combination with a certain background or another object in the background. When the confidence value of the target class increases, there may be a negative bias caused by the background or some other objects in the background.

Figure 3:
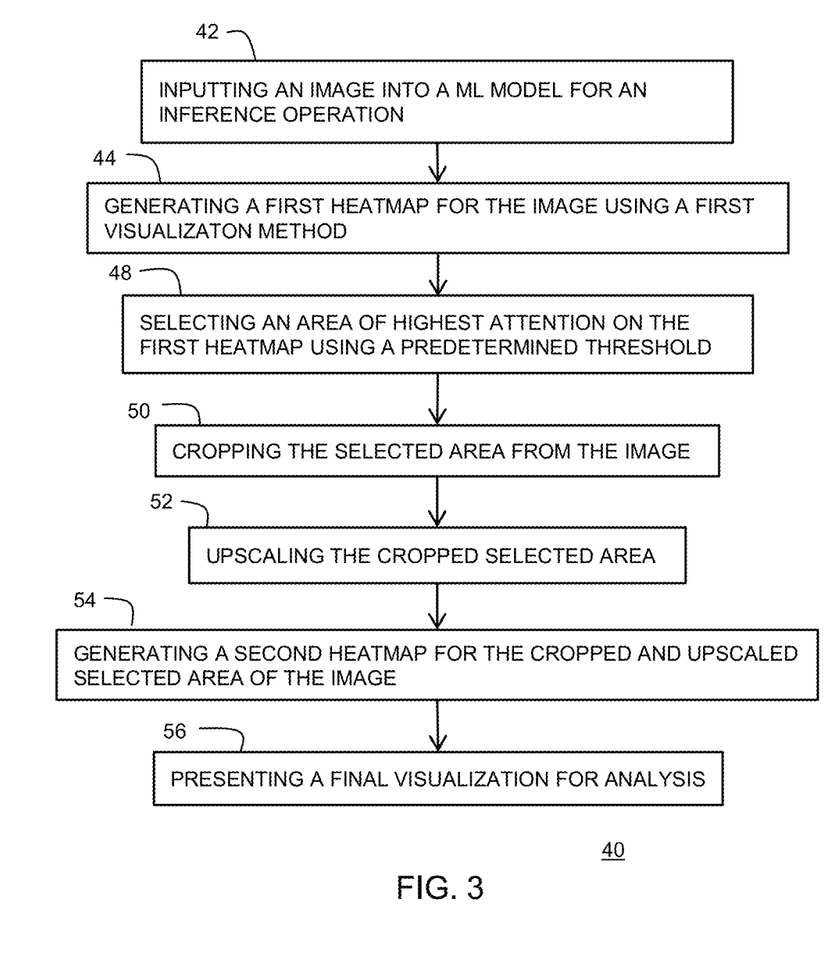
FIG. 3 illustrates a flowchart of a method for a machine learning model (ML) in accordance with an embodiment.

FIG. 3 illustrates a flowchart of method 40 for analyzing a machine learning model (ML) in accordance with an embodiment. Method 40 begins at step 42. At step 42, an image is input into an ML model for an inference operation. At step 44, a first heatmap is generated for the image using a first visualization method. At step 48, an area of highest attention is selected from the first heatmap using a predetermined threshold. At step 50, the selected area is cropped from the image. At step 52, the cropped selected area is upscaled. At step 54, a second heatmap is generated for the cropped and upscaled selected area of the image. At step 56, a final visualization is presented for analysis.

Figure 4:
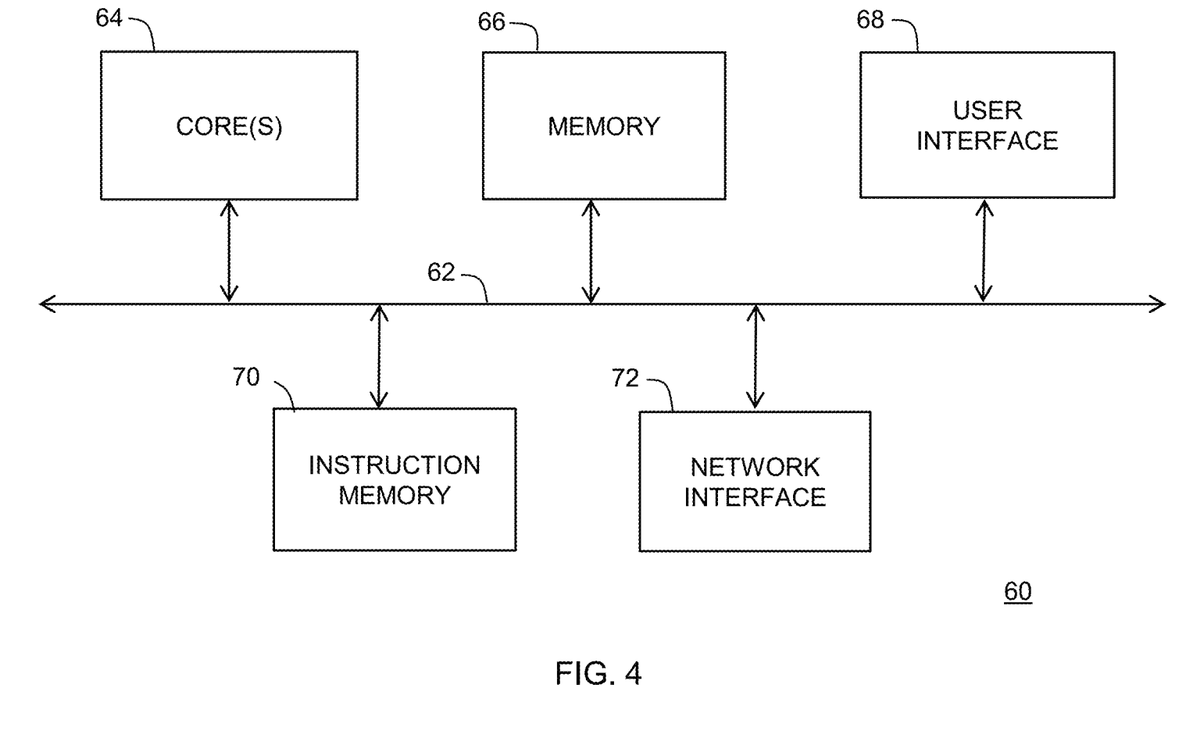
FIG. 4 illustrates a data processing system useful for implementing an embodiment of the present invention.

FIG. 4 illustrates data processing system 60 useful for implementing an embodiment of the present invention. Data processing system 60 may be implemented on one or more integrated circuits and may be used in an implementation of the described embodiments. Data processing system 60 includes bus 62. Connected to bus 62 is one or more processor cores 64, memory 66, user interface 68, instruction memory 70, and network interface 72. The one or more processor cores 64 may include any hardware device capable of executing instructions stored in memory 76 or instruction memory 70. For example, processor cores 64 may execute the machine learning algorithms used for training and operating the ML model. Processor cores 64 may be used to execute the method for explainability described herein. Processor cores 64 may be, for example, a microprocessor, field programmable gate array (FPGA), application-specific integrated circuit (ASIC), or similar device. Processor cores 64 may be implemented in a secure hardware element and may be tamper resistant.

Memory 66 may be any kind of memory, such as for example, L1, L2, or L3 cache or system memory. Memory 66 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. In one embodiment, memory 66 may be used to store weight matrices for the ML model.

User interface 68 may be connected to one or more devices for enabling communication with a user such as an administrator. For example, user interface 68 may be enabled for coupling to a display, a mouse, a keyboard, or other input/output device. Network interface 72 may include one or more devices for enabling communication with other hardware devices. For example, network interface 72 may include, or be coupled to, a network interface card (NIC) configured to communicate according to the Ethernet protocol. Also, network interface 72 may implement a TCP/IP stack for communication according to the TCP/IP protocols. Data samples for classification may be input via network interface 72, or similar interface. Various other hardware or configurations for communicating are available.

Instruction memory 70 may include one or more machine-readable storage media for storing instructions for execution by processor cores 64. In other embodiments, both memories 66 and 70 may store data upon which processor cores 64 may operate. Memories 66 and 70 may also store, for example, encryption, decryption, and verification applications. Memories 66 and 70 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a visualization for explaining a behavior of a machine learning (ML) model, the method comprising:
    inputting an image having an input pixel resolution into a ML model for an inference operation, wherein the input pixel resolution corresponds to the input resolution of the ML model;
    generating a first heatmap for the image using a first visualization method;
    selecting an area of highest attention on the first heatmap using a predetermined threshold;
    mapping the selected area of highest attention of the first heatmap to the image;
    cropping the selected area of highest attention indicated on the first heatmap from the image;
    upscaling the cropped selected area from the image to generate a cropped and upscaled selected area of the image using all of the input pixel resolution for the cropped and upscaled selected area;
    generating a second heatmap for the cropped and upscaled selected area of the image; and
    presenting a final visualization for analysis using the second heatmap.

2. The method of claim 1, wherein generating the second heatmap for the cropped and upscaled selected area of the image further comprises generating the second heatmap for the cropped and upscaled selected area of the image using a second visualization method.

3. The method of claim 2, wherein the first and second visualization methods are each a gradient-weighted class activation mapping (GradCAM) visualization method.

4. The method of claim 2, wherein the first visualization method is a gradient-weighted class activation mapping (GradCAM) visualization method and the second visualization method is a visualization method different from the GradCAM visualization method.

5. The method of claim 1, wherein upscaling the cropped selected area further comprises one of either zooming in the cropped selected area or using the cropped selected area from the image when the image has a higher resolution than the cropped image.

6. The method of claim 1, wherein selecting the area of highest attention on the first heatmap using a predetermined threshold further comprises selecting multiple areas of highest attention that exceed the predetermined threshold.

7. The method of claim 1, wherein generating a first heatmap for the image using a first visualization method further comprises generating the first heatmap for the image using a gradient-weighted class activation mapping (GradCAM) visualization method on a last convolutional layer of a neural network of the ML model.

8. The method of claim 1, wherein the predetermined threshold is equal to a $75^{th}$ percentile of heatmap values.

9. The method of claim 1, wherein generating the second heatmap for the cropped and upscaled selected area of the image further comprises generating the second heatmap for the cropped and upscaled selected area using a gradient-weighted class activation mapping (GradCAM) method on a last convolutional layer of a neural network of the ML model.

10. A computer program comprising instructions executable by a processor, for executing a method for generating a visualization for explaining a behavior of a machine learning (ML) model, the executable instructions comprising:
- instructions for inputting an image having an input pixel resolution into a ML model for an inference operation, wherein the input pixel resolution corresponds to the input resolution of the ML model;
- instructions for generating a first heatmap for the image using a first visualization method;
- instructions for selecting an area of highest attention on the first heatmap using a predetermined threshold;
- instructions for mapping the selected area of highest attention of the first heatmap to the image;
- instructions for cropping the selected area of highest attention indicated on the first heatmap from the image;
- instructions for upscaling the cropped selected area from the image to generate a cropped and upscaled selected area of the image using all of the input pixel resolution for the cropped and upscaled selected area;
- instructions for generating a second heatmap for the cropped and upscaled selected area of the image; and
- instructions for presenting a final visualization for analysis using the second heatmap.

11. The computer program of claim 10, wherein the instructions for generating the second heatmap for the cropped and upscaled selected area of the image further comprises instructions for generating the second heatmap for the cropped and upscaled selected area of the image using a second visualization method.

12. The computer program of claim 11, wherein the first and second visualization methods are each a gradient-weighted class activation mapping (GradCAM) visualization method.

13. The computer program of claim 11, wherein the first visualization method is a gradient-weighted class activation mapping (GradCAM) visualization method and the second visualization method is a visualization method different from the GradCAM visualization method.

14. The computer program of claim 10, wherein the instructions for upscaling the cropped selected area further comprises one of either zooming in the cropped selected area or using the cropped selected area from an original image when the original image has a higher resolution than the cropped image.

15. The computer program of claim 10, wherein the instructions for selecting the area of highest attention on the first heatmap using a predetermined threshold further comprises instructions for selecting multiple areas of highest attention that exceed the predetermined threshold.

16. The computer program of claim 10, wherein the instructions for generating the first heatmap for the image using a first visualization method further comprises instructions for generating the first heatmap for the image using a gradient-weighted class activation mapping (GradCAM) on a last convolutional layer of a neural network of the ML model.

17. The computer program of claim 10, wherein the predetermined threshold is equal to a $75^{th}$ percentile of heatmap values.

18. The computer program of claim 10, wherein the instructions for generating the second heatmap for the cropped and upscaled selected area of the image further comprises instructions for generating the second heatmap for the cropped and upscaled selected area using a gradient-weighted class activation mapping (GradCAM) on a last convolutional layer of a neural network of the ML model.

* * * * *